UNITED STATES PATENT OFFICE.

WILLIAM N. BREWSTER, OF PHILADELPHIA, PENNSYLVANIA.

IMPROVEMENT IN MEDICAL COMPOUNDS OR BITTERS.

Specification forming part of Letters Patent No. 150,129, dated April 28, 1874; application filed March 25, 1874.

*To all whom it may concern:*

Be it known that I, WILLIAM N. BREWSTER, of the city of Philadelphia and State of Pennsylvania, have invented a certain Medical Compound called "Dyspepsia Bitters," of which the following is a specification.

This invention relates to that class of medical compounds used for the cure of dyspepsia and other diseases resulting from indigestion; and it consists in a composition formed by mixing sherry wine, alcohol, rhubarb, bitter aloes, soda, ginger root, Peruvian bark, peppermint herbs, and the fluid extract of dandelion.

To prepare the dyspepsia bitters, take one quart of sherry wine, to which add one pint of alcohol reduced by mixing it with equal parts of water; then take one ounce of rhubarb, one ounce of bitter aloes, one ounce of soda, one ounce of pulverized ginger root, one ounce of Peruvian bark, and one ounce of ground peppermint herb, all of which mix with the aforesaid sherry wine and alcohol; afterward add one ounce of the fluid extract of dandelion. When the ingredients are thoroughly mixed the compound can be flavored with tea-berry or other suitable extract. The proportions of the several ingredients can be varied from those above given to suit the condition of the patient and the character of the disease.

I claim as my invention—

The above composition, composed of the ingredients, in about the proportions, and for the purpose set forth.

In testimony whereof I hereunto sign my name in presence of two subscribing witnesses.

WILLIAM N. BREWSTER.

Witnesses:
    FRANCIS D. PASTORIUS,
    CHARLES MARTIN.